United States Patent

Tsuchiya et al.

[11] Patent Number: 5,941,795
[45] Date of Patent: Aug. 24, 1999

[54] CONTROL SYSTEM FOR A SINGLE SERVO DURING MULTIPLE SPEED CHANGES

[75] Inventors: Saoto Tsuchiya; Masaaki Nishida; Yoshihisa Yamamoto; Hiroshi Tsutsui, all of Anjo, Japan

[73] Assignee: Aisin AW Co., Ltd., Japan

[21] Appl. No.: 08/833,389

[22] Filed: Apr. 4, 1997

[30] Foreign Application Priority Data

Apr. 4, 1996 [JP] Japan .................................... 8-082881

[51] Int. Cl.$^6$ .................................................. F16H 61/04
[52] U.S. Cl. .......................... 477/148; 477/143; 477/154; 477/156
[58] Field of Search .................................... 477/143, 144, 477/148, 149, 154, 155, 156, 120, 121

[56] References Cited

U.S. PATENT DOCUMENTS

| | | | |
|---|---|---|---|
| 4,955,257 | 9/1990 | Terayama et al. | 477/154 |
| 5,527,236 | 6/1996 | Kimura et al. | 477/156 X |
| 5,702,322 | 12/1997 | Sunada et al. | 477/154 X |

Primary Examiner—Charles A. Marmor
Assistant Examiner—Ankur Parekh
Attorney, Agent, or Firm—Lorusso & Loud

[57] ABSTRACT

The present invention prevents shift shock and reduces time required to execute the complete speed change operation in the case where a second speed change is commanded while a first speed change operation is still in progress. If a down-shift to a first speed stage is commanded during an up-shift operation from the first to the second speed, the hydraulic pressure in the second speed change operation is controlled in accordance with the state of the first speed change operation at the time of generation of the command for the second speed change. For example, if a down-shift to the first speed stage is commanded during the torque phase of an up-shift operation from first to second speeds, namely, before change in the rotational speed of the input shaft has started, only completion control of the down-shift operation is executed. On the other hand, if the down-shift to the first speed stage is commanded during the inertia phase of the up-shift operation, namely, after the speed change has been started, hydraulic control of the down-shift is started with the initial speed change control.

12 Claims, 8 Drawing Sheets

| thr0\thr | 0% | 5% | ... | 90% | 100% |
|---|---|---|---|---|---|
| 0% | 0 | 0 | ... | −90 | −100 |
| 5% | 10 | 0 | ... | −80 | |
| ⋮ | ⋮ | ⋮ | | ⋮ | ⋮ |
| 90% | 180 | 175 | ... | 0 | 0 |
| 100% | 200 | 190 | ... | 10 | 0 | [N·m]

CONTROL SYSTEM FOR A SINGLE SERVO DURING MULTIPLE SPEED CHANGES

BACKGROUND OF THE INVENTION

1. Field of the Invention

The present invention relates to an automatic transmission mounted on a vehicle and, more particularly, to a speed change control system for addressing the problem which occurs when, during one speed change operation, need for another speed change operation different therefrom is determined.

2. Description of the Related Art

In a vehicle having an automatic transmission, during a speed change operation for change from a first speed stage to a second speed stage, a command for a speed change to a speed stage different from the second speed stage is sometimes issued. For example, during a speed change from a first speed to a second speed, the accelerator pedal may be depressed suddenly ("kick-down"), thus generating an instruction signal to execute a shift to the first speed.

Conventionally, as described in Japanese Patent Application Laid-Open Sho No.61-48561 for example, even if an up-shift instruction is entered during a down-shift operation, the up-shift is inhibited until the down-shift operation is completed. As a result, a sufficient amount of oil is discharged from an accumulator of a high-speed stage frictional engagement unit. When the servo hydraulic pressure of the high-speed stage frictional engagement unit has decreased to a sufficiently low level, the up-shift operation is started. In this manner a large shock in speed change is prevented, which shift shock would otherwise result from the resumption of oil supply to the accumulator of the high-speed frictional engagement unit before oil is completely discharged, as in the case where an up-shift operation is started during a down-shift operation.

However, with the prior art system described above, since the up-shift operation (second speed change) is inhibited until the down-shift operation (first speed change) is completed, the start of the down-shift is delayed for an unsatisfactorily long period of time.

SUMMARY OF THE INVENTION

Accordingly, an object of the present invention is to provide an automatic transmission control system capable of preventing shift shock and reducing the time required to execute the speed change, even for a second speed change commanded during a first speed change operation as described above.

Accordingly, the present invention provides an automatic transmission control system including a control unit for receiving signals from various sensors indicative of vehicle operating conditions and outputting a hydraulic pressure signal to hydraulic pressure control means to control hydraulic pressure applied to a hydraulic pressure servo of a predetermined frictional engagement element. The control unit, in turn, includes a multi-speed-change control means for setting the hydraulic pressure control signal for execution of a second speed change in accordance with the status of an earlier speed change operation not yet completed, when the need for the second speed Change is determined during the first speed change operation (e.g. from the first to the second speed) based on signals from the respective sensors.

Preferably, the multi-speed-change control means sweeps hydraulic pressure along a predetermined gradient before the first speed change operation produces a change in rotational speed of an input shaft (e.g. torque phase), and outputs the hydraulic pressure control signal to cause a predetermined change (dictated by the gradient) in the rotational speed of the input shaft when the first speed change operation has started to produce a change in rotational speed of the input shaft (e.g. inertia phase). Since there is no change in rotational speed before that resulting from the first speed change operation (in torque phase), a sudden change in torque can be avoided by sweep-controlling the hydraulic pressure in conformance with a predetermined gradient. On the other hand, when there is a change in rotational speed of the input shaft (in the inertia phase), an excellent speed change characteristic can be obtained by controlling the hydraulic pressure to bring the change in rotational speed of the input shaft to a predetermined value.

In a preferred embodiment, the first speed change operation includes a plurality of hydraulic pressure control stages such as servo startup control, torque phase control, inertia phase control, and completion control, and the second speed change operation includes a plurality of hydraulic pressure control stages such as initial speed change control and completion control. In this preferred embodiment the multi-speed-change control means sets the hydraulic pressure control stages of the second speed change operation in accordance with the hydraulic pressure control stage of the first speed change operation at the time of determination of need for the second speed change. Since operation is shifted to a predetermined hydraulic pressure control stage for the second speed change in dependence upon the hydraulic pressure control stage of the first speed change operation, at the time of determination of the need for the second speed change, control logic for multi-speed-change becomes unnecessary, thus reducing the memory required for the control unit. Therefore, it is possible to reduce cost and improve overall reliability.

Preferably, the predetermined change in rotational speed is set based on a target rotational speed change calculated in the first speed change operation. Because a predetermined change in rotational speed in the second speed change operation is set based on the target rotational speed change in the first speed change operation, hydraulic pressure control in the second speed change operation can be executed appropriately based on the target rotational speed change in the first speed change operation, although detection by the sensors may not be immediate or precise due to the transient state created during the second speed change operation in which there is a change in the rotational speed.

The input torque may be estimated at the time of determination of need for the second speed change, and the second speed change operation may be started with a hydraulic pressure corresponding to that estimated input torque. Thus, it is possible to change from the first speed change operation to the second speed change operation without delay by setting the hydraulic pressure necessary to cause a change in rotational speed in the second speed change operation. Therefore, the time required to execute the overall speed change operation is reduced.

Alternatively, the input torque at the time of determination of need for the second speed change is obtained by calculating a correction value from the difference between degree of throttle opening on which hydraulic pressure control in the first speed change operation is based and degree of throttle opening at the time of determination of the second speed change and then correcting the input torque on which hydraulic pressure control in the first speed change operation is based using the correction value. In this manner it is possible to prevent a response delay in hydraulic control by making corrections using the difference between the degrees of throttle opening based on the input torque in the first speed change operation. Direct estimation of the input torque during the second speed change operation, which is likely to cause a response delay in the hydraulic control, is undesirable due to the fact that estimation of engine torque when there is a change in rotational speed results in a time delay because of difficulty in precise detection of engine rotational speed because the engine is in a transient state. When the degree of throttle opening is smaller at the time of determination of the second speed change than at the time of initiation of the first speed change operation, the correction value is set so as to be smaller than the correction value for when the degree of throttle opening is larger at the time of determination of the second speed change than at the time of initiation of the first speed change operation. If the throttle opening at the time of determination of the second speed change is close to the value at the time of the first speed change operation, the torque correction value is set to be relatively small. Therefore, shock during the speed change resulting from an excessively lowered hydraulic pressure can be avoided.

If the second speed change is commanded during the first speed change operation, for example, command for a down-shift to the first speed stage during an up-shift operation from the first to the second speed, the hydraulic pressure in the second speed change operation is controlled depending on the status of the first speed change operation at the time of determination of the second speed change. For example, if a down-shift to the first speed stage is commanded during the torque phase of an up-shift operation from the first to the second speed as shown in FIG. 3, namely before change in rotational speed of the input shaft is started, only completion control for that down-shift is executed. If a down-shift to the first speed stage is commanded during the inertia phase, i.e. after the speed change has started, hydraulic pressure control is executed from the initial speed change control of that down-shift.

Since the hydraulic pressure control for the second speed change is executed in accordance with the status (point of progression) of the first speed change operation at the time of determination of the second speed change, there is no need to wait until the first speed change operation has terminated, thus reducing the time required to execute the overall speed change operation. Also, appropriate hydraulic pressure control can be always performed in accordance with the speed change status.

DESCRIPTION OF THE PREFERRED EMBODIMENTS

An embodiment of the present invention will now be described with reference to a multi-speed-change wherein an instruction is given to execute a down-shift to the first speed during progress of an up-shift from the first to the second speed.

Figure 1A:
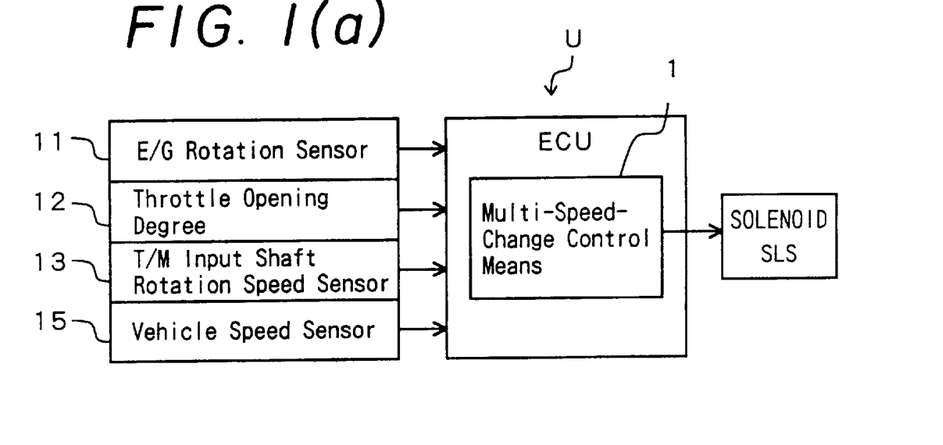
FIG. 1(a) is a block diagram of the electronic portion of an embodiment of an automatic transmission control system of the present invention.

FIG. 1 illustrates the electronic portion of an embodiment of the present invention wherein electric signals from an engine rotation sensor 11, a throttle opening degree sensor 12, an automatic transmission input rotation (turbine rotation) sensor 13, and a vehicle speed (output rotation) sensor 15 are received by an electronic control unit U. The electronic control unit U includes a multi-speed-change control means 1, which conducts an arithmetic operation and outputs a signal based thereon to a linear solenoid valve 16.

Figure 1B:
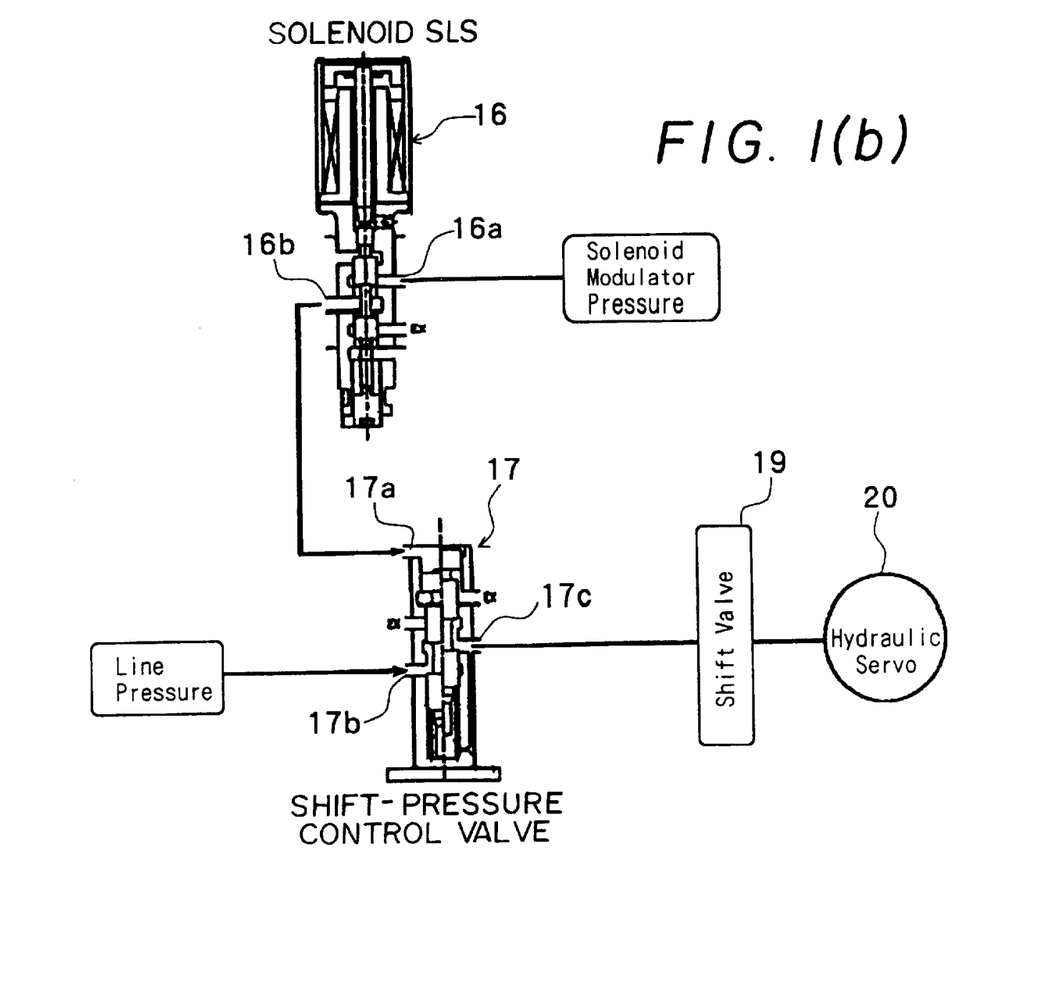
FIG. 1(b) is a diagram of the hydraulic control portion of the same embodiment.

The linear solenoid valve 16 constitutes a hydraulic control means. Based on a current value (hydraulic control signal) from the electronic control unit U, the hydraulic control means regulates a solenoid modulator pressure received at input port 16a and outputs the regulated pressure through output port 16b to a control chamber 17a of a shift pressure control valve 17. Based on the hydraulic pressure within the control hydraulic chamber 17a, the shift pressure control valve 17 regulates a line pressure received at an input port 17b and outputs the regulated line pressure through an output port 17c to a hydraulic pressure servo 20 which operates a clutch or brake through a shift valve 19.

With reference to the flow chart of FIGS. 2(a) and 2(b) and the time chart of FIG. 3, hydraulic pressure control for the up-shift from the first to the second speed and the down-shift from the second to the first speed will now be explained.

Figure 2A:
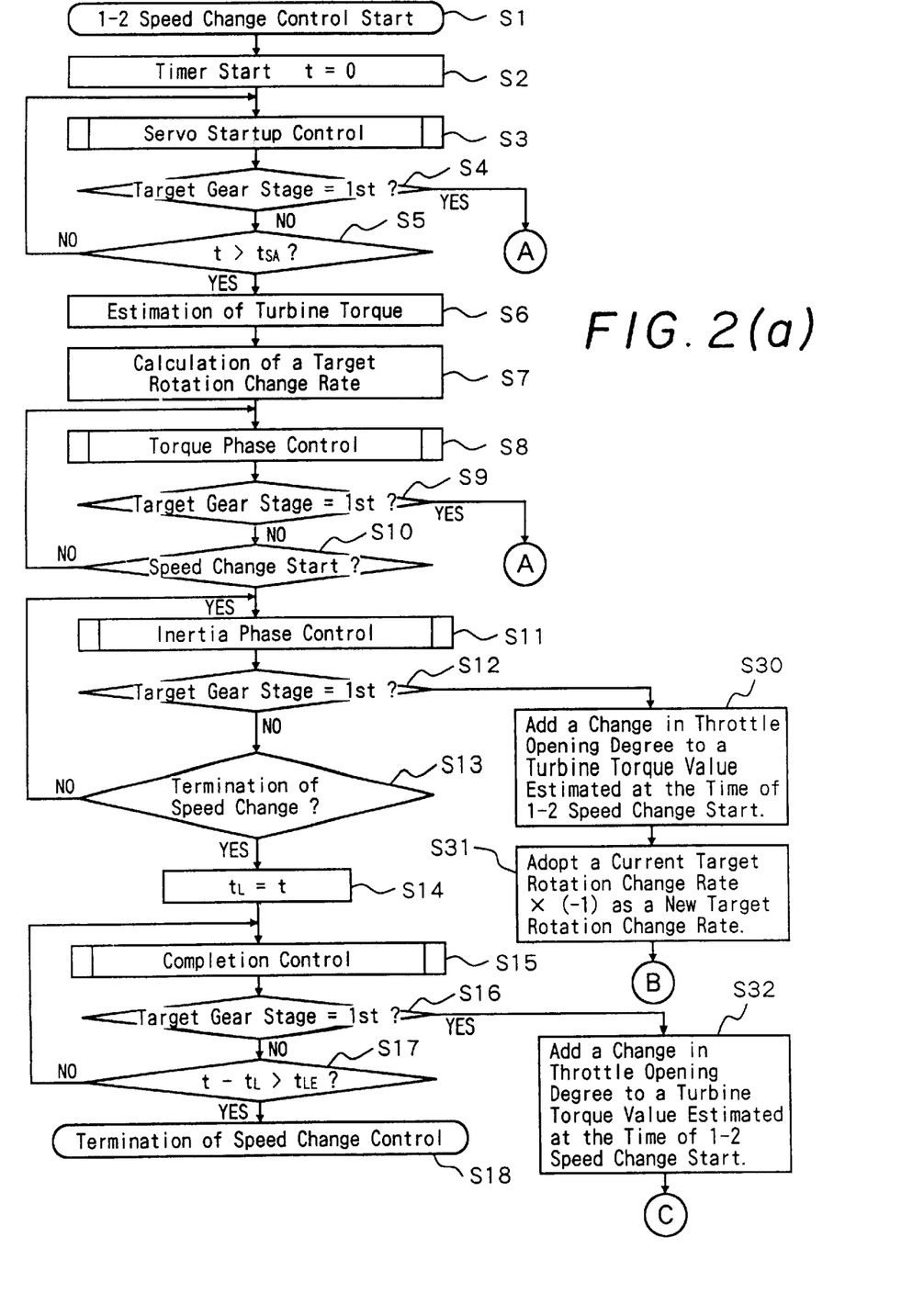
FIG. 2(a) is a flow chart of a control routine for an up-shift from the first speed to the second speed.
Figure 3A:
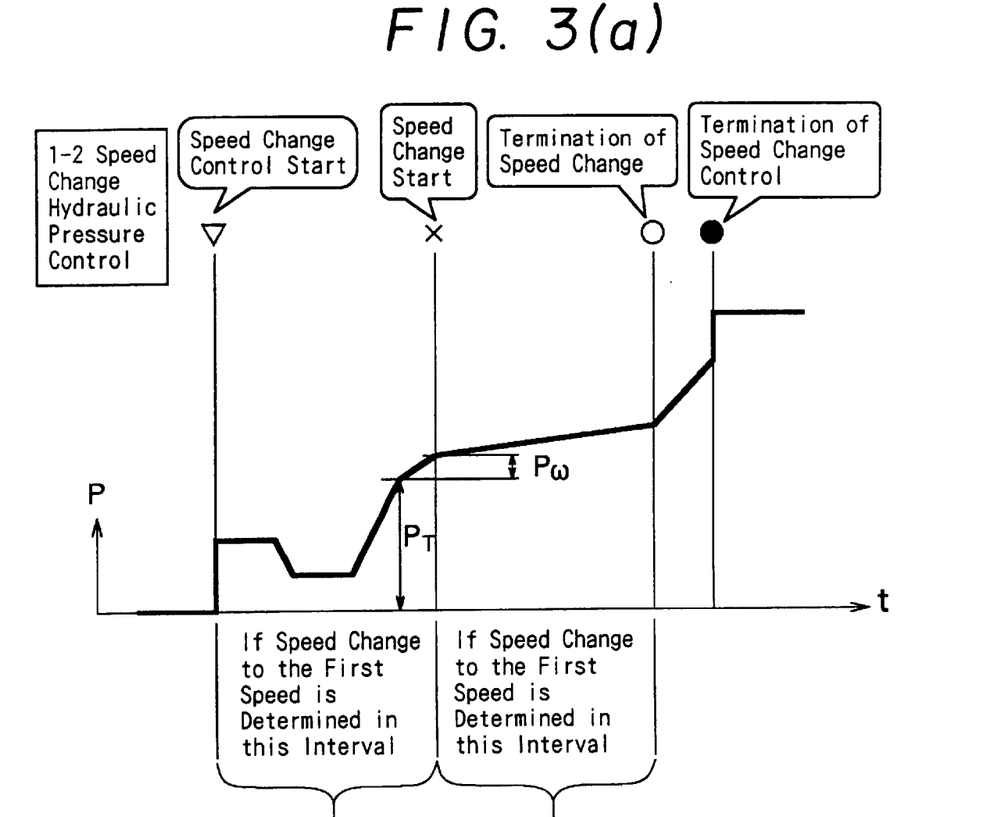
FIG. 3 is a time chart of hydraulic pressure control in accordance with the present invention wherein portion (a) relates to the up-shift from the first to the second speed and portion (b) relates to the down-shift from the second to the first speed.

In the up-shift operation shown in FIG. 2(a) and FIG. 3(a), when an instruction to execute speed change from first to second is given (S1) (start of speed change control), first, a timer starts counting (S2) and then servo startup control is executed (S3). If the target gear stage is not the first speed (S4), the aforementioned servo startup control is continued for a predetermined time tSA (S5), so that a hydraulic pressure is supplied to the control chamber of hydraulic servo 20 for a frictional engagement element (e.g. second brake B2) to be engaged in second speed.

Then, the engagement hydraulic pressure is maintained at a predetermined value which is higher than a piston stroke pressure and which causes no change in rotational speed of the input shaft. Next, a turbine (input) torque is estimated (S6). The turbine torque is estimated by finding an engine torque from a map on the basis of degree of throttle opening and engine rotational speed, calculating a speed ratio based on the Input/Output rotational speeds of the torque converter, finding a torque ratio by applying the calculated speed ratio to a map, and multiplying the engine torque thus found by the torque ratio. Furthermore, a target rotational speed change ratio (target rotational acceleration) $\omega'$, which is set to coincide with initiation of change in rotational speed of the input shaft, is calculated (S7).

Next, torque phase control is executed(S8). That is, based on a target engagement hydraulic pressure $P_T$ just before the inertia phase, i.e. just before initiation of change in the input rotational speed calculated on the basis of the aforementioned turbine torque and a gradient (first sweep angle) fixed by a predetermined time interval, the value of the hydraulic servo pressure is swept upward. Furthermore, after the hydraulic servo pressure reaches the engagement (target) hydraulic pressure $P_T$, it is swept upward at a smaller sweep angle (slower rate of increase) than the first sweep angle due to the hydraulic pressure P$\omega$ calculated from the above-mentioned target rotational speed change ratio $\omega'$. Then, the second sweep-upward is continued until change in rotational speed of the input shaft reaches a reference value for determining the start of the speed change, which change is detected-by the input shaft rotation sensor 13. Accordingly, when the hydraulic pressure P$\omega$ (second sweep-upward amount) corresponding to the inertia torque calculated from the target rotation change ratio is added, the speed change operation is started. In general, at that point in time, the input engine torque is well balanced with the load, i.e. vehicle driving force, determined by the torque transmitted by the frictional engagement element on the engagement side. Until start of the speed change operation is determined, the frictional engagement element on the engagement side is in a slipping state, which is referred to as a torque phase, causing a change in torque distribution ratio but not in rotational speed. After that, the torque transmitted by the above-mentioned frictional engagement element increases and eventually surpasses the engine torque, establishing the inertia phase in which the engine rotational speed starts to decrease (the rotational speed of the input shaft changes).

A determination is again made as to whether or not the target gear stage is the first speed (S9). After the aforementioned start of speed change is determined (S10), inertia phase control is established (S11). In the inertia phase control, subsequent to the target rotation speed change ratio $\omega'$, the signal of the input shaft rotational speed sensor 13 is monitored and feedback-controlled so that the rotational speed of the input shaft is subjected to a predetermined target change. Then, during the inertia phase control, whether or not the target gear stage is the first speed is judged again (S12). The inertia phase control is continued until the speed change operation is terminated (S13). When the timer determines lapse of a predetermined time interval $t_L$ (S14), completion control is initiated (S15). Once again a judgement is made as to whether or not the target gear stage is the first speed (S16). If the timer determines expiration of a predetermined time interval $t_{LE}$ after the aforementioned termination of the speed change operation (S17), the speed change control is terminated (S18). The servo startup control (S3), torque phase control (S8), inertia phase control (S11) and completion control (S15) constitute a plurality of hydraulic control stages of the up-shift operation (first speed change).

The hydraulic pressure on the engagement side increases gradually so that the torque transmission of the frictional engagement elements gradually increases. When the difference in arotational speed between the input and output sides of the frictional engagement element reaches zero, the speed change shift is finished. Furthermore, a cushioning spring of each frictional engagement element on the engagement side is slightly further compressed so that the hydraulic pressure of the hydraulic pressure servo on the engagement side becomes equal to a line pressure. Then, the speed change control is terminated.

Figure 2B:
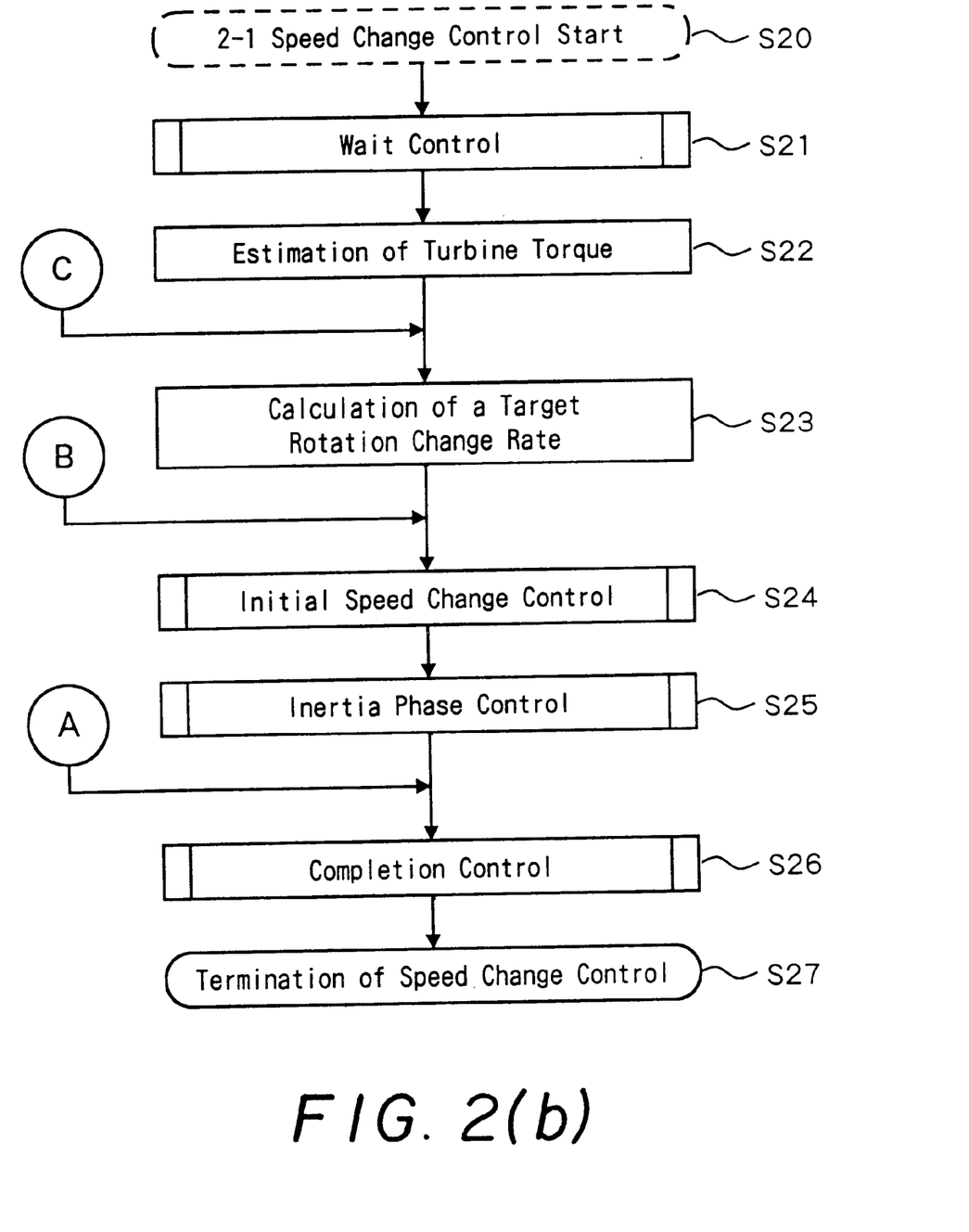
FIG. 2(b) is a flow chart of a control routine for a down-shift from the second speed to the first speed.
Figure 3B:
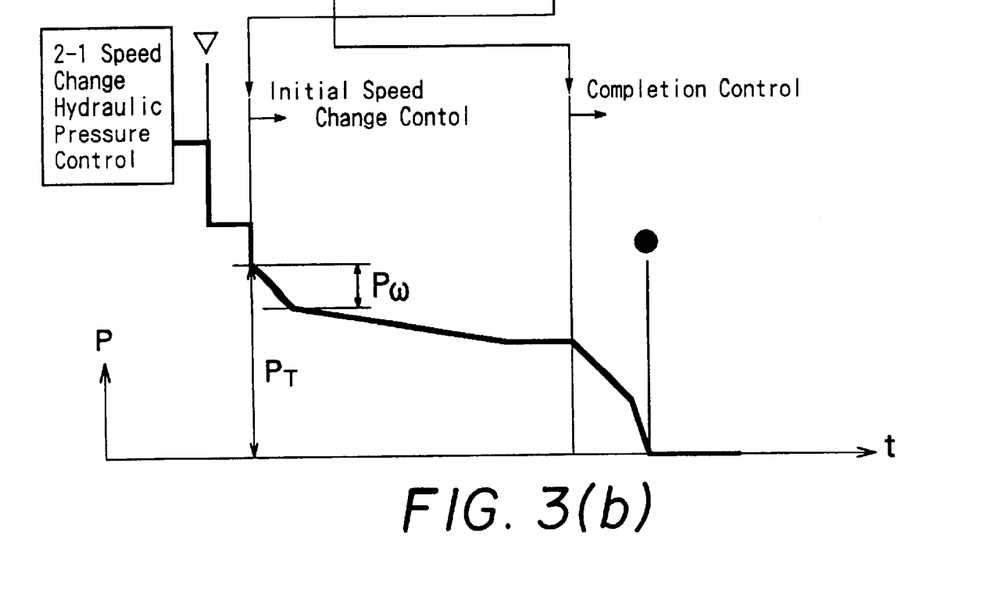

On the other hand, the down-shift operation from the second speed to the first speed is conducted as shown in FIGS. 2(b) and 3(b). First, based on a determination that the speed change from the second to the first speed should be executed, the speed change control is started (S20). Then, delay control is executed (S21). As a result, the pressure in the hydraulic servo 20 for the frictional engagement elements being engaged in the second speed is reduced by a predetermined increment below the line pressure, upon start of the speed change control (speed change instruction).

Then, after a predetermined time has lapsed, a turbine torque is estimated as mentioned above (S22), a target rotational speed change rate is calculated (S23), and initial speed change control is executed (S24). Consequently, the hydraulic pressure is reduced to a predetermined engagement hydraulic pressure $P_T$ calculated based on an input (turbine) torque, i.e. the engagement hydraulic pressure $P_T$ which immediately precedes initiation of change of the rotational speed of the input shaft, so that the initial speed change control is established. Furthermore, as described earlier, the pressure is swept down from the predetermined engagement hydraulic pressure $P_T$, based on the change in hydraulic pressure P$\omega$ calculated from the target rotational speed change rate $\omega'$ when the rotational speed of the input shaft has started to change.

Then, due to the sweep-down operation, the inertia phase is established so that the engine rotation speed increases. Then, the inertia phase control is executed based on change in the input shaft rotational speed, to gradually decrease the hydraulic pressure (S25). The gradient in the inertia phase control is determined based on the target change in rotational speed of the input shaft as calculated during the aforementioned up-shift operation. When the engine rotational speed increases to the first speed level of the automatic transmission, the speed change is completed. Thereafter, the servo hydraulic pressure is drained until it becomes zero and the speed change control is thereby terminated. This operation is effected in several stages. Specifically, after the initial speed change control is terminated, completion control is executed (S26) and, finally, the speed change control is terminated (S27). The wait control (S21), the initial speed change control (S24), and the completion control (S25) constitute a plurality of hydraulic pressure control stages during the down-shift operation (second speed change).

If an instruction to execute a down-shift from the second to the first speed is issued during an up-shift from the first to the second speed, before speed change is started, that is, prior to the inertia phase in which a speed change occurs in the input shaft, the down-shift operation is started with the aforementioned completion control. If need for a down-shift is determined after the speed change has been started, that is, after the inertia phase, the down-shift operation is started with the aforementioned initial speed change control.

As shown in the flow chart of FIG. 2(a), when it is judged (S4) that the target gear stage during the servo startup control (S3) is the first speed stage and (S9) that the target gear stage during the torque phase control (S8) is also the first speed stage, that is, if an instruction to execute the down-shift to the first speed is generated before the speed change from the first to second speed is started (that is, prior to the inertia phase), the down-shift control is started with the completion control as shown in FIG. 2(b).

Figure 4:
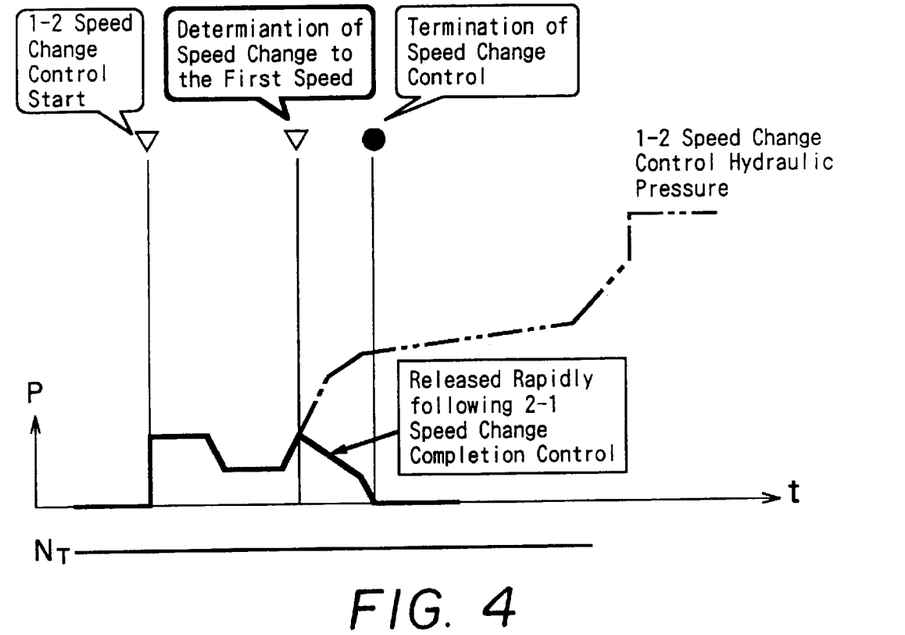
FIG. 4 is a time chart for hydraulic pressure control responsive to a speed change command for a shift to the first speed stage issued during the torque phase of a speed change operation for a shift from the first to the second speed.

If a speed change to the first speed is instructed (commanded) during the first sweep-up (torque phase) based on the target engagement hydraulic pressure $P_T$ as shown in FIG. 4, the hydraulic pressure in the hydraulic servo 20 is immediately swept down along a predetermined gradient in response to that instruction following the completion control of the speed change from the second to the first speed, and then released rapidly. In this state, there is no change in the rotational speed $N_T$ of the input shaft (turbine).

If it is judged (S9) that the target gear stage during the inertia phase control (S11) is the first speed stage in the routine represented by the flow chart of FIG. 2(a), the turbine torque value estimated when the speed change from the first to second speed is started, is corrected based on the detected degree of throttle opening (S30). Then, the current target rotational speed change rate (see S7), calculated prior to the start of the speed change from the first to the second speed, is multiplied by −1 so as to obtain a new target rotational speed change rate(S31).

Figure 5:
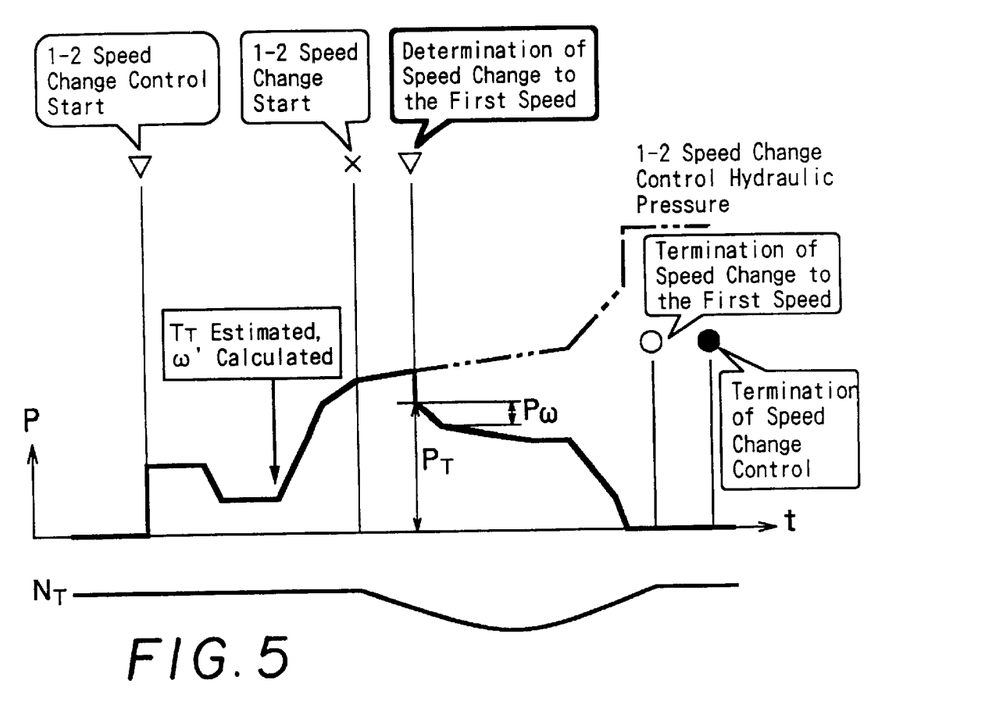
FIG. 5 is a time chart for hydraulic pressure control responsive to a speed change command for a shift to the first speed stage issued during the inertia phase of a speed change operation for a shift from the first to the second speed.

Thus, if a down-shift to first speed is commanded, as shown in FIG. 5, after the speed change from the first to the second speed has been started, that is, if need for a down-shift to the first speed is indicated during the inertia phase control of an up-shift, the down-shift operation is started with the initial speed change control, using (1) the change in hydraulic pressure Pω required to obtain the engagement hydraulic pressure $P_T$ based on the turbine torque estimated at the time of generation of the instruction to down-shift and (2) the target rotational speed change rate, based on the turbine torque (see S6) estimated prior to the start of the torque phase control (see S7). In the down-shift operation to the first speed stage initiated during a speed change operation for a shift from the first to the second speed, the input shaft (turbine) rotation $N_T$ decreases temporarily due to the aforementioned speed change but, after speed change to the first speed has been terminated, the original rotational speed is regained.

Figure 7A:
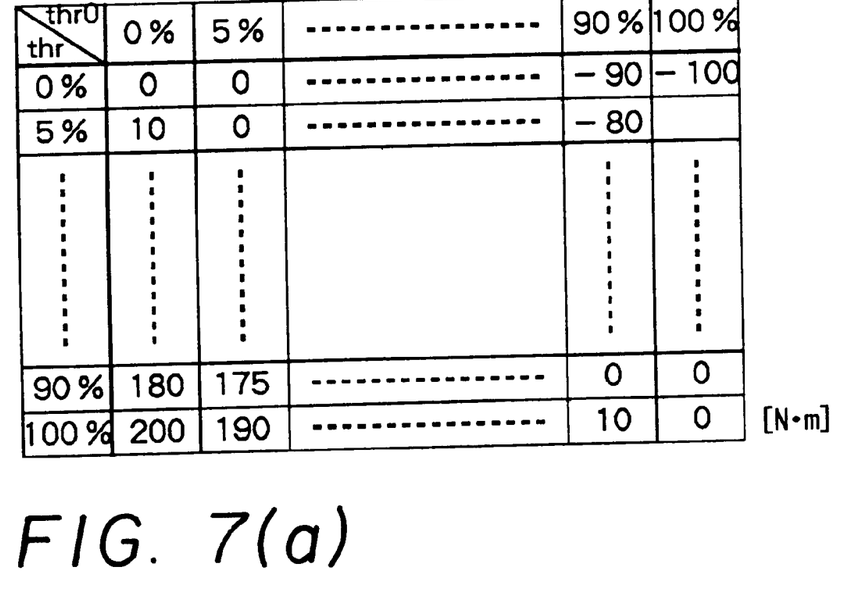
FIG. 7(a) is a table for determination of a correction value of the input torque from the degree of throttle opening during the speed change from the first to the second speed and degree of throttle opening at the time of issue of the speed change command for a shift to the first speed stage.
Figure 7B:
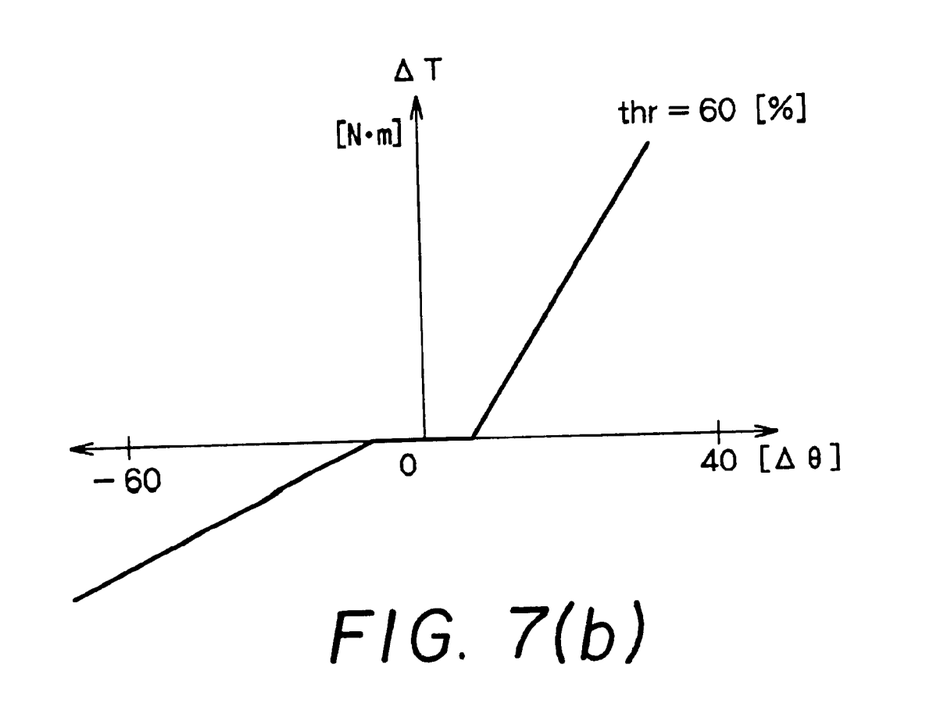
FIG. 7(b) is a graph of change in the correction value with change in difference between the throttle openings.

In the above-mentioned step S30, the correction of the turbine torque is made by estimating the difference between the turbine torque as obtained in step S6 and the current turbine torque. Such a difference, caused by the change in turbine torque, is calculated from the degree of throttle opening (tho) at the time of the aforementioned torque calculation and the current degree of throttle opening (thr), using a map as shown in FIG. 7(a). According to the map, as shown in FIG. 7(b), if the difference Δθ between the values of throttle opening tho and thr is positive (the right side of the graph), that is, if the degree of throttle opening (thr) is larger than that calculated at the time of the speed change from the first to the second speed (tho), even for the same current throttle opening degree (e.g. thr=60[%]), the turbine torque correction (δT) is set to a relatively large value. If the difference Δθ between the two values for throttle opening is negative (tho>thr), the turbine torque correction amount (Δθ) is set to a relatively small value. In this manner a shift shock, which might otherwise occur if the down-shift operation was to advance quickly due to over-reduction of hydraulic pressure, i.e. where the current degree of throttle opening thr is brought back closer to the calculated degree of throttle opening degree tho, is avoided.

From the turbine torque obtained by correcting the turbine torque value in step S6, the target hydraulic pressure $P_T$ is calculated. By multiplying the target rotational speed change obtained in step S8 by −1, the downward gradient is set for calculation of the hydraulic pressure change rate Pω. Consequently, the down-shift operation is started with the initial speed change control. The reason for this will now be described. If there is a change in rotational speed upon estimation of the engine torque, it is difficult to detect the engine rotational speed precisely and without delay because the engine is in a transient state. In other words, because a load resulting from a difference between the automatic transmission input torque, determined by the torque transmission of the frictional engagement elements, and actual engine torque is imposed on the engine (the state in which the engine is caused to rotate by the transmission). Another reason is that it is difficult to set a target rotational speed change at the time of initial change in the newly input rotational speed by detecting a speed change ratio with the automatic transmission in a transient state.

If the first speed stage is selected as the target gear stage (S16) during the completion control (S15) as shown in FIG. 2(a), as in step S30, the turbine torque value estimated in step S6 is corrected in consideration of the aforementioned change in the degree of throttle opening, to estimate a new turbine torque (S32). Based on this new turbine torque value, the down-shift operation is started with the calculation of the target rotational speed change rate as shown in FIG. 2(b).

Figure 6:
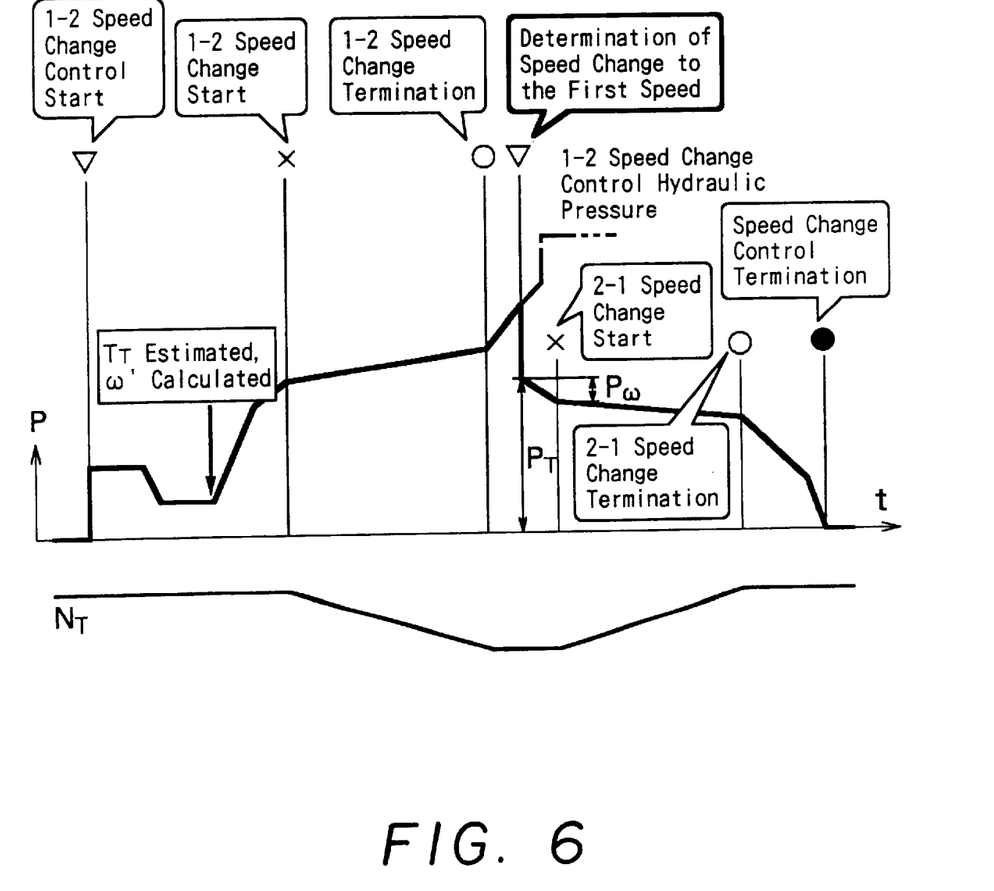
FIG. 6 is a time chart for hydraulic pressure control responsive to a speed change command for a shift to the first speed stage issued after the speed change from the first to the second speed has been terminated.
Figure 8A:
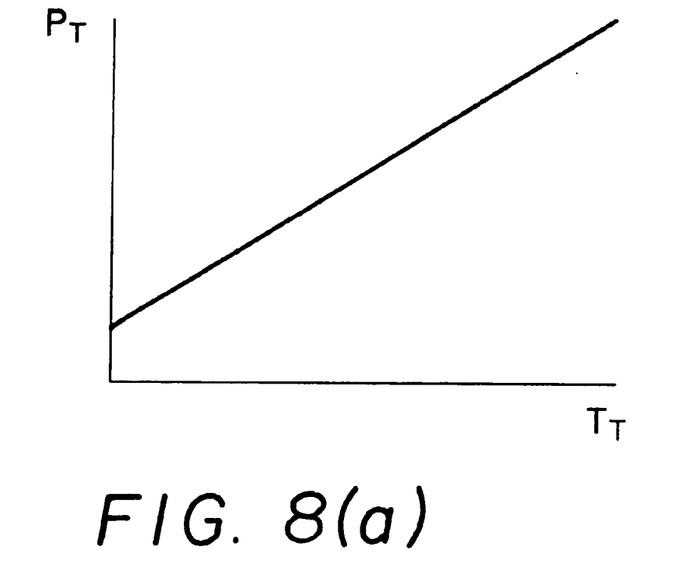
FIG. 8(a) is a graph of engagement hydraulic pressure $P_T$ for a frictional engagement element versus input (turbine) torque $T_T$.
Figure 8B:
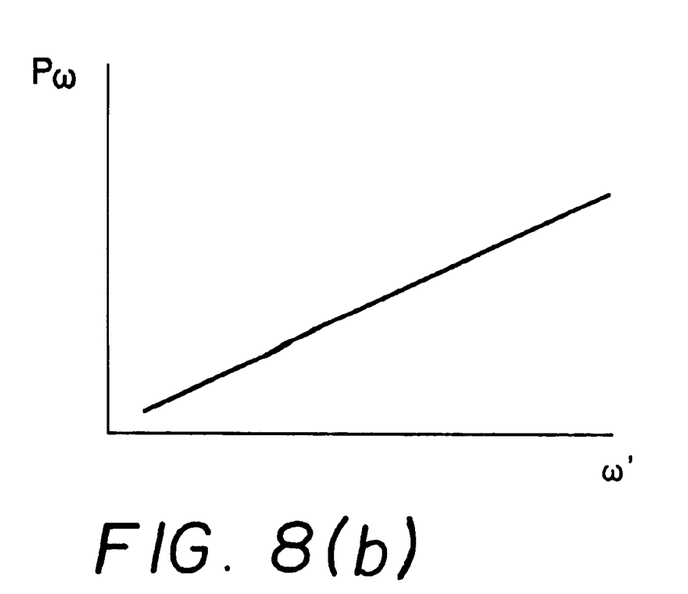
FIG. 8(b) is a graph of hydraulic pressure change rate $P\omega$ versus target rotational speed change rate $\omega'$.

That is, based on a turbine torque $T_T$ obtained by adding the above-mentioned correction value to the turbine torque estimated prior to the start of the torque phase control as shown in FIG. 6, the engagement hydraulic pressure $P_T$ is calculated as shown in FIG. 8(a). Also, based on the target rotational speed change rate ω' at this time, the hydraulic pressure change rate Pω is calculated as shown in FIG. 8(b). After the speed change from the first to the second speed is terminated, in response to an instruction for a speed change to the first speed stage, the initial control of the down-shift operation is executed, using the engagement hydraulic pressure $P_T$ and the hydraulic pressure change rate Pω. Subsequently, the speed change from the second to the first speed is started, and then inertia control is executed so as to terminate the speed change from the second to the first speed. Then, the hydraulic pressure is released and the multi-speed-change control is terminated. If the speed change to the first speed stage is commanded after the speed change from the first to the second speed has been terminated, as described previously, the input shaft (turbine) rotational speed $N_T$ is changed based on the speed change from the first to the second speed and the speed change from the second to the first speed. Then, with the termination of the speed change from the second to the first speed, the original rotational speed is regained.

Although the multi-speed-change control has been described for the case where the down-shift to the first speed stage is determined during an up-shift operation from the first to the second speed, the same control may also be executed in the case where the down-shift is commanded during other up-shift operations, for example, from the second to the third speed. Furthermore, the same control may also be executed in the case where the up-shift operation is commanded by a manual operation during a down-shift.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for an automatic transmission having an input shaft for receiving torque from an engine, said control system comprising:

a hydraulic servo for operating a frictional engagement element in first and second speed changes of the transmission;

a control unit for receiving signals from sensors indicative of vehicle running conditions and for outputting a hydraulic pressure signal;

hydraulic pressure control means for controlling said hydraulic servo, for engagement/disengagement of said frictional engagement element, by output of a hydraulic pressure to said hydraulic servo in accordance with said hydraulic pressure signal; and multi-speed-change control means for determining the status of a first speed change in progress, responsive to a hydraulic pressure signal commanding a second speed change, for discontinuing said first speed change and sweeping the hydraulic pressure to said hydraulic servo along a predetermined gradient, responsive to a determination that said first speed chance has not yet progressed to the point of producing a chance in rotational speed of the input shaft, and for discontinuing said first speed change and setting the hydraulic pressure to said hydraulic servo to cause a predetermined chance in the rotational speed of the input shaft, responsive to a determination that said first speed change has progressed to cause a change in the rotational speed of the input shaft.

2. The control system of claim 1, wherein said first speed change and said second speed change each include a plurality of hydraulic pressure control stages, and wherein said multi-speed-change control means sets the hydraulic pressure control stages of said second speed change in accordance with the hydraulic pressure control stage of said first speed change at the time of said determination of need for said second speed change.

3. The control system of claim 1, wherein said predetermined change in rotational speed is set based on a target rotational speed change calculated in a control routine for said first speed change.

4. The control system of claim 1, wherein said multi-speed-change control means estimates input torque received by said input shaft at the time of said determination of need for said second speed change, and initiates said second speed change with a hydraulic pressure corresponding to said estimated input torque.

5. The control system of claim 4 wherein said input torque at the time of said determination of said second speed change is estimated by calculating a correction value from a difference between a first degree of throttle opening on which hydraulic pressure control in said first speed change is based and a second degree of throttle opening at the time of said determination of need for said second speed change and by then correcting an input torque on which hydraulic pressure control in said first speed change is based, using said correction value, to obtain the estimated input torque.

6. The control system of claim 5, wherein said correction Valve increases with increase in the difference between said second degree of throttle opening and said first degree of throttle opening.

7. The control system of claim 6, wherein said first degree of throttle opening is the degree of throttle opening at a point in time when said first speed change is initiated and said second degree of throttle opening is a current degree of throttle opening.

8. A control system for an automatic transmission having an input shaft for receiving torque from an engine, said control system comprising:

a hydraulic servo for operating a frictional engagement element in first and second speed changes of the transmission;

a control unit for receiving signals from sensors indicative of vehicle running conditions and for outputting hydraulic pressure shift signals commanding said speed changes;

hydraulic pressure control means for controlling said hydraulic servo, for engagement/disengagement of said frictional engagement element, by output of a hydraulic pressure to said hydraulic servo in accordance with a first control program responsive to a shift signal commanding the first speed change or in accordance with a second control program responsive to a shift signal commanding the second speed change; and multi-speed-change control means for determining the status of execution of the first control program and for switching to execution of the second control program at one stage of a plurality of stages of the second control program, responsive to a shift signal commanding the second speed change received subsequent to initiation of execution of the first control program but prior to completion of its execution, said multi-speed-change control selecting said one stage from among the plurality of stages of the second control program in accordance with the determined status of the first control program.

9. The control system of claim 8 wherein said multi-speed control means determines said status of execution of the first control program based on detection of rotational speed of the input shaft and selects said one of the plurality of stages of the second control program in accordance with whether or not the detected rotational speed has started to change.

10. The control system of claim 9 wherein said multi-speed control means selects a stage of the second control program providing sweep of the hydraulic pressure to said hydraulic servo, as said one stage, responsive to a determination that the rotational speed has not yet started to change and selects a stage of the second control program providing a predetermined change to the rotational speed, as said one stage, responsive to a determination that the rotational speed has started to change.

11. The control system of claim 8 wherein the first control program executes the first speed change in a series of stages including:

servo startup control by which the hydraulic pressure to said hydraulic servo is brought to a value which immediately precedes initiation of change in the rotational speed;

torque phase control by which the rotational speed is brought to a reference value indicative of the start of the first speed change;

first inertia phase control by which the rotational speed is brought to a target value for the first speed change; and first completion control by which the hydraulic pressure to said hydraulic servo is further changed;

wherein the plurality of stages of the second control program includes, in succession:

initial speed change control by which the hydraulic pressure to said hydraulic servo is brought to a value which immediately precedes initiation of change in the rotational speed;

second inertia phase control by which the rotational speed is brought to a target value for the second speed change; and second completion control by which the hydraulic pressure to said hydraulic servo is further changed; and wherein said multi-speed-change control means determines one of said stages of the first control program as a current stage and as the status of the first control program.

12. The control system of claim 11 wherein said multi-speed-change control means switches to a point in the second control program preceding the initial speed change control responsive to a determination of the first inertia phase control or the first completion control as the status of the first control program, and switches to a point in the second control program subsequent to the second inertia phase control and preceding the second completion control, responsive to a determination of the servo starting control or the torque phase control as the status of the first control program.

* * * * *

UNITED STATES PATENT AND TRADEMARK OFFICE
CERTIFICATE OF CORRECTION

PATENT NO. : 5,941,795
DATED : August 24, 1999
INVENTOR(S) : TSUCHIYA et al

It is certified that error appears in the above-identified patent and that said Letters Patent is hereby corrected as shown below:

Col. 6, line 4 "arotational" should read
-- a rotational--;

Col. 7, line 59 "($\delta$T)" should read
--($\Delta$T)--;

Col. 7, line 62 "($\Delta\theta$)" should read
--($\Delta$T)--;

Col. 9, line 28 "chance" should read
--change--; and

Col. 9, line 65 "Vaive" should read
--Value--.

Signed and Sealed this

Twenty-seventh Day of March, 2001

*Attest:*

NICHOLAS P. GODICI

*Attesting Officer*

*Acting Director of the United States Patent and Trademark Office*